United States Patent
Gage

[11] Patent Number: 5,363,363
[45] Date of Patent: Nov. 8, 1994

[54] APPARATUS AND METHOD FOR LASER NOISE CANCELLATION IN AN OPTICAL STORAGE SYSTEM USING A FRONT FACET MONITOR SIGNAL

[75] Inventor: Edward C. Gage, Rochester, N.Y.

[73] Assignee: Eastman Kodak Company, Rochester, N.Y.

[21] Appl. No.: 961,965

[22] Filed: Oct. 16, 1992

[51] Int. Cl.⁵ ............................................. G11B 7/00
[52] U.S. Cl. ................................. 369/116; 369/107
[58] Field of Search ............. 369/116, 13, 110, 44.32, 369/44.37, 124, 126.47, 107, 44.23, 112, 44.28; 360/114; 359/18; 358/446, 461

[56] References Cited

U.S. PATENT DOCUMENTS

| | | | |
|---|---|---|---|
| 4,150,402 | 4/1979 | Tietze et al. | 358/446 |
| 4,548,463 | 10/1985 | Cato et al. | 359/18 |
| 4,691,241 | 9/1987 | Tomohisa et al. | 358/461 |
| 4,896,222 | 1/1990 | Fukai | 358/446 |
| 4,989,198 | 1/1991 | Kojima et al. | 369/116 |
| 5,003,529 | 3/1991 | Ikeda | 369/116 |
| 5,042,023 | 8/1991 | Yokota | 369/47 |
| 5,065,253 | 11/1991 | Ishii | 369/107 |
| 5,067,117 | 11/1991 | Shimizu et al. | 369/116 |
| 5,067,122 | 11/1991 | McGee | 369/116 |
| 5,202,860 | 4/1993 | Takahashi et al. | 369/13 |
| 5,208,799 | 5/1993 | Nakao et al. | 369/110 |
| 5,222,055 | 6/1993 | Fujita | 369/44.32 |
| 5,247,510 | 9/1993 | Lee et al. | 369/112 |
| 5,250,796 | 10/1993 | Taguchi et al. | 369/116 |
| 5,282,188 | 1/1994 | Gage | 369/112 |

Primary Examiner—Paul M. Dzierzynski
Assistant Examiner—Kim-Kwok Chu
Attorney, Agent, or Firm—Raymond L. Owens

[57] ABSTRACT

In an optical storage system, a non-signal radiation component from a laser unit which is leaves the optical path as a result of selection of a signal polarization component for interaction with the optical storage medium is applied to a first detector. The output electrical signal from the first detector is combined with the output electrical signal from the second detector to which the radiation component, which has interacted with the storage medium, is applied. The two electrical signals are combined in a manner to reduce the noise from the laser unit which is superimposed on the signal from the second detector. In the typical read/write head, the non-signal beam can be the deflected radiation from the beam splitter.

16 Claims, 3 Drawing Sheets

APPARATUS AND METHOD FOR LASER NOISE CANCELLATION IN AN OPTICAL STORAGE SYSTEM USING A FRONT FACET MONITOR SIGNAL

BACKGROUND OF THE INVENTION

1. Field of Invention

This invention relates generally to optical storage systems and, more particularly, to the detection apparatus associated with a write-once system by which the change in reflectivity of an irradiated region of a storage region, and hence the binary state represented by the region, is identified.

2. Description of the Related Art

In the write-once optical storage system, noise can be introduced into the system by several mechanisms. For example, the radiation detectors can introduce shot noise and thermal (Johnson) noise into the signal. The effect of the shot noise and the thermal noise can not be reduced by differential detection systems. However, one of the largest sources of noise are the instabilities in the laser radiation unit. In certain applications in which a differential detection system is employed, a reduction in noise can automatically be achieved.

Referring to FIG. 1, a write once-optical information storage system is illustrated. A radiation beam is generated by means of a laser diode 11. The radiation beam is collimated by collimating lens 12 and applied to beam splitter 13. The portion of the radiation beam with a polarization determined by the characteristics of the beam splitter 13 is transmitted by the beam splitter 13 and applied to quarter wave plate 14. The portion of the radiation beam which is not transmitted by the beam splitter 13 is reflected thereby and leaves the optical path of the storage system. The portion of the radiation beam transmitted by the quarter wave plate 14 is applied to objective lens 15. The objective lens focuses the radiation beam through a protective layer 5B and onto an information bearing surface 5A of the storage medium 5. The radiation beam is reflected from the storage medium surface 5A and is recollimated by objective lens 15 The recollimated radiation beam is transmitted through the quarter-wave plate 14, and applied to polarization beam splitter 13. The portion of the reflected radiation beam which has been rotated by interaction with the storage medium and the quarter wave plate will have a linearly polarized radiation component rotated by an angle of 90° from the polarized radiation component transmitted by the beam splitter 13. The rotated radiation component will be reflected by the beam splitter 13 and applied to radiation detector 16. The portion of the radiation beam which has not been rotated by interaction with the storage medium will be transmitted through the polarization beam splitter 13. This radiation component transmitted by the beam splitter will remain as part of the laser cavity radiation. The output signal from radiation detector 16 is applied to amplifier 17. The output signal from the amplifier can be processed to determine the information stored on the storage medium.

The operation of the write once information storage system can be understood in the following manner. The memory layer 5A of the storage medium is fabricated so that the reflectivity of selected regions of the storage medium can be altered with respect to the surrounding region. When information is stored on the memory layer, the reflectivity of the selected regions, establishes along a predetermined path or track the interpretation of selected regions as a sequence of logical signals. The quarter wave plate converts the linearly polarized radiation into a circularly polarized radiation beam. When the circularly polarized radiation is reflected from the storage layer, the differential absorption between the two orientation states of the storage layer will provide a detectable difference in the signal amplitude. Therefore, the reflectivity state of the currently illuminated portion of the storage layer can be determined from the output signal of amplifier 17. The determination of the reflectivity of the illuminated selected region permits the correlation of the illuminated region of the storage layer with a logic state and, consequently, the retrieval of information stored on the storage layer.

As will be clear to those skilled in the art, the differential absorption can be relatively small. Therefore, the signal or modulated components of the radiation beam can be relatively small and a carrier signal to noise ratio (CNR) can be small. One of the principal contributions to the noise is the result of instabilities in the laser unit. In order to compensate for laser unit instabilities, one technique has been to extract a portion of the laser radiation from the radiation source and compensate for noise in the signal-bearing radiation beam by combining the extracted radiation portion with the signal-bearing radiation source. An example of this compensation is found in U.S. Pat. No. 4,896,222 issued in the name of Fukai. In U.S. Pat. No. 4,150,402 issued in the name of Tietze et al., a portion of the radiation beam is used to determine a general level of the laser radiation, thereby permitting a calibration for a signal-bearing or modulated beam. In U.S. Pat. No. 5,105,413 issued in the name of Bakx, a technique for dividing a reflected radiation from a recording media to remove the effects of write modulation is disclosed. However, none of the references disclose a technique for reducing the laser noise in an optical recording head.

PROBLEM TO BE SOLVED

A need has therefor been felt for a technique and associated apparatus that would compensate for the instabilities in the laser radiation in an optical read/write head.

SUMMARY OF THE INVENTION

It is an object of the present invention to provide an improved read/write head for an optical information storage system.

It is a feature of the present invention to provide apparatus and method for minimizing the effect of laser radiation instabilities in an optical read/write head.

It is yet another feature of the present invention to detect front facet radiation and use the detected radiation to compensate for laser-induced noise in the read/write head of an optical information storage system.

The present invention is directed to overcoming one or more of the problems set forth above. Briefly summarized, according to one aspect of the present invention, a portion of the radiation from the front facet of a laser unit in a write-once storage system is detected by the information retrieval apparatus prior to interaction of the radiation beam with the information storage medium. The amplitude of the signal resulting from the detected radiation is adjusted and the resulting signal is combined with the information bearing signal derived from the radiation reflected from the storage medium.

In the preferred embodiment, the compensating radiation is derived from radiation reflected from the optical path by the polarization beam splitter of the read/write head.

ADVANTAGES OF THE INVENTION

When the signals are combined in an appropriate manner, the noise resulting from instabilities of the laser unit can be significantly reduced. In addition, the reduction in noise is still significant even in the presence of variation in the storage medium.

These and other aspects, objects, features and advantages of the present invention will be more clearly understood and appreciated from a review of the following detailed description of the preferred embodiments and appended claims, and be reference to the accompanying drawings.

DETAILED DESCRIPTION OF THE INVENTION

1. Detailed Description of the Figures

Figure 1:
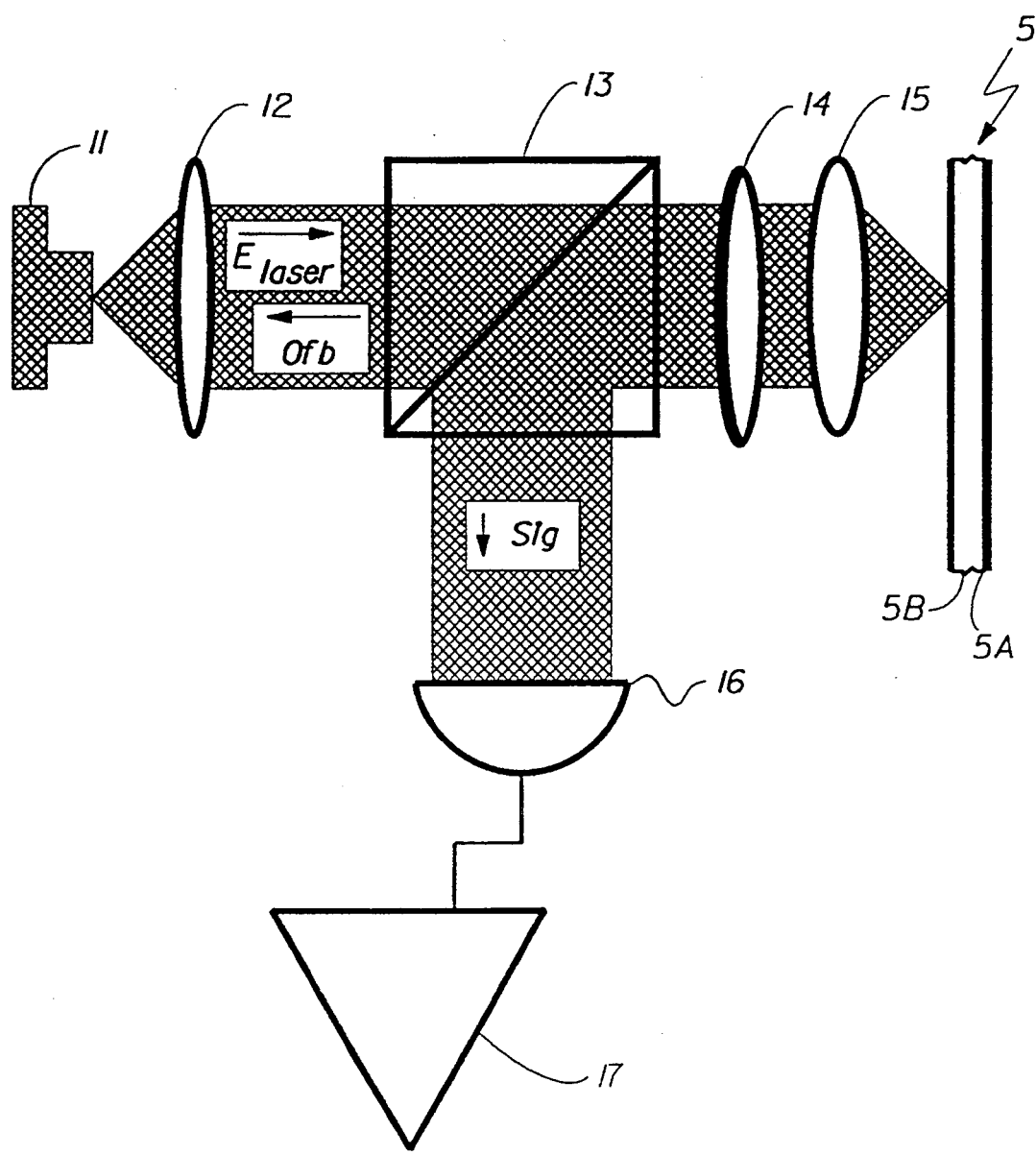
FIG. 1 is a block diagram of a read/write system in which the present invention can be utilized.

FIG. 1 has been described with reference to the related art.

Figure 2:
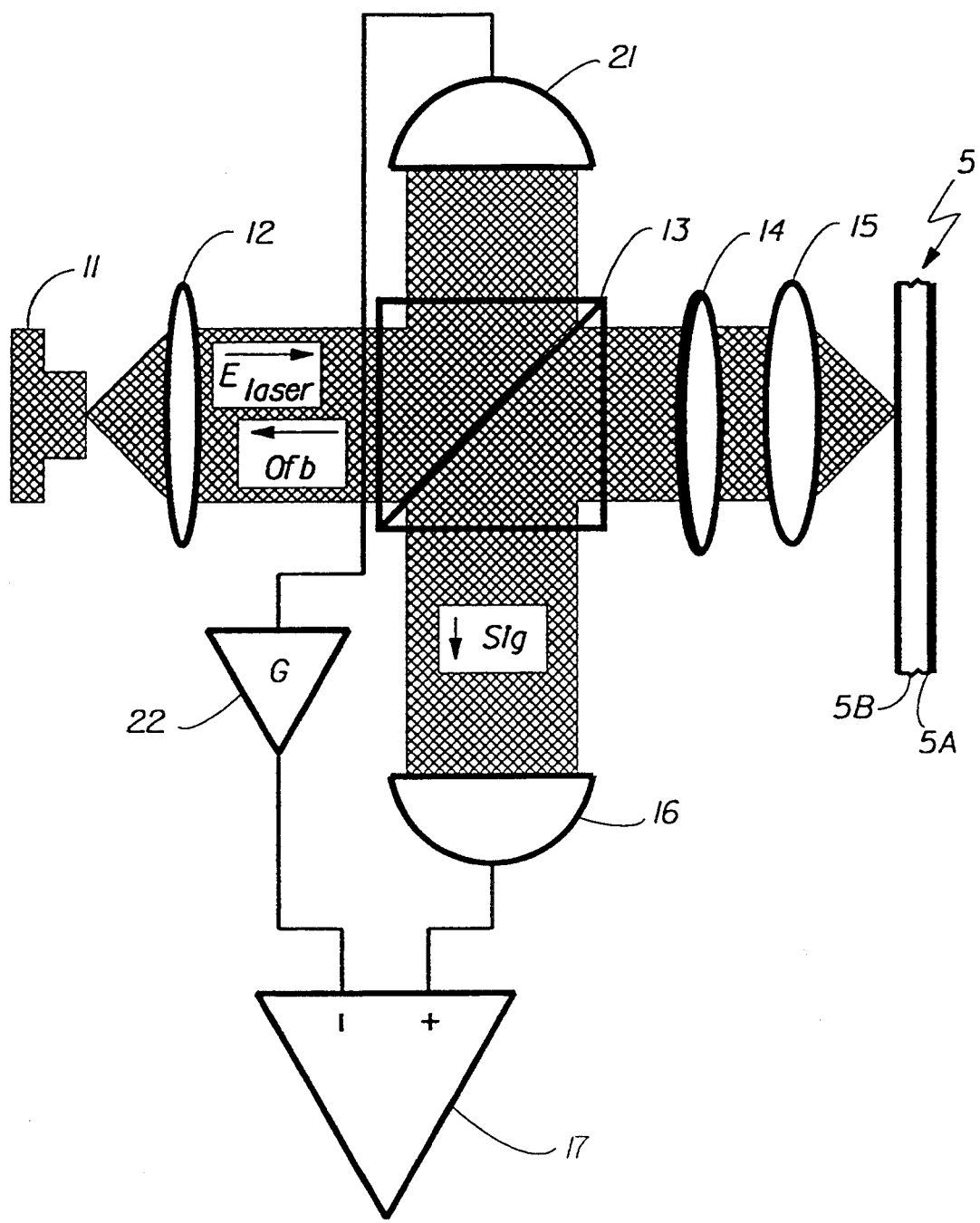
FIG. 2 is the read/write information storage system of FIG. 1 along with the apparatus for compensating for laser induced noise in the signal-bearing radiation.

Referring to FIG. 2, the read/write optical head of FIG. 1 along with the additional apparatus required for reduction of noise according to the present invention is shown. The radiation beam applied to beam splitter 13 is divided into two components, the radiation component which is transmitted by the polarization beam splitter 13 and applied to storage medium 5 and the radiation component which is reflected out of the extended optical cavity by the beam splitter 13. The radiation component which is reflected out of the extended laser unit cavity (i.e., the extended laser unit optical cavity including the laser unit, the storage medium and the intervening optical components) is applied to the radiation detector 21. The electrical output signal from radiation detector 21 is applied to amplifier 22. Amplifier 22 has a gain G, the gain G determining the amplitude of the signal at the output terminal. The output signal of amplifier 22 is applied to a first input terminal of a difference amplifier, the second input terminal of the difference amplifier receiving the signal from amplifier 17. The difference amplifier provides the phase relationship by which the changes in the information modulated radiation component have the changes in the laser radiation resulting from instabilities in the laser unit subtracted therefrom.

Figure 3:
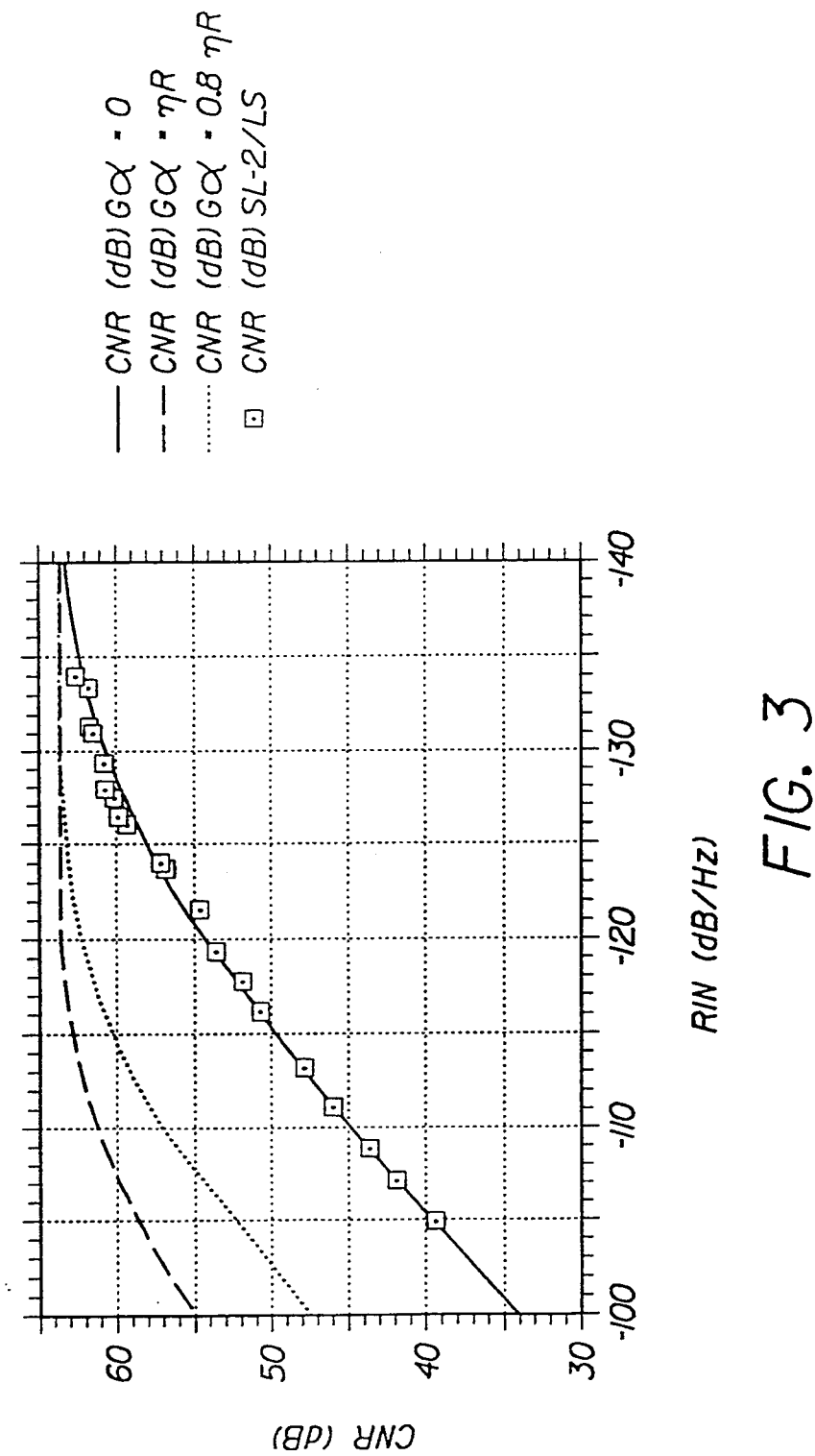
FIG. 3 is a graphical display illustrating the laser unit noise reduction resulting from the use of a compensating signal according to the present invention.

Referring to FIG. 3, the reduction of the laser-induced noise resulting from the use of a laser monitoring signal is shown. The solid line indicates the carrier to noise ratio (CNR) that can be expected as a function of the cancellation signal. The solid line indicates the theoretical CNR as function laser relative intensity noise (RIN) when no cancellation signal is combined with the information bearing signal. The experimental verification of this functionality is shown by the experimental points which are in the immediate vicinity of the theoretical curve. The dotted curve in FIG. 3 displays the resulting theoretical relationship between the CNR and the RIN as a result of an 80% cancellation of the laser induced noise. The dashed curve in FIG. 3 displays the relationship between CNR and RIN with 100% cancellation of the laser induced noise.

2. Operation of the Preferred Embodiments

The operation of the retrieval of information from a write once optical storage system can be understood as follows. The radiation from the laser unit is divided into two portions by the polarization beam splitter. The first radiation portion interacts with the information storage medium and is the information bearing portion. The second radiation portion is reflected out of the optical path and out of the extended optical cavity. This reflected radiation component does not receive any of the information content and can therefore be used as a measure of the current laser unit radiation without the information superimposed thereon. In the preferred embodiment, both radiation components are converted to electrical signals by radiation detectors. The non-information bearing electrical signal has the gain determined and is then subtracted from the information bearing electrical signal component. In this manner, the variation in the output signal of the difference amplifier can be principally determined by the modulation of the information bearing radiation component.

In order to study a model of laser noise cancellation, a model has been developed. The photocurrent, iRF, from the detector for a recorded tone is given by:

$$i_{RF} = \eta R I_{Laser} + \eta \Delta R I_{Laser} \sin(\omega t)/2 \tag{1}$$

where $\eta$ is a function of the head efficiency to the detector and the detector responsivity, R is the average media reflectivity, $\Delta R$ is the difference in reflectivity for the lands and the marks of the medium, $I_{LASER}$ is the read power of the radiation source, and $\omega$ is the frequency at which data is being read. After amplification, the signal from the detector monitoring the radiation emitted by the radiation source is given by:

$$i_{FF} = G\alpha I_{Laser} \tag{2}$$

where G is the amplification (gain) and $\alpha$ contains the efficiency of the monitor detector and the detector's responsivity. The laser power and the reflectivity can be written as:

$$I_{Laser} = I + \delta I \tag{3}$$

and $$R = R + \delta R \tag{4}$$

where the fluctuations $\delta I$ and $\delta R$ have a mean value of zero.

$$[(\delta I)^2] = I^2 B 10^{RIN/10} \tag{5}$$

$$[(\delta R)^2] = R^2 B 10^{MRN/10} \tag{6}$$

where B is the measurement bandwidth, RIN is the laser's relative intensity noise, and MRN is the media reflectivity noise, both the RIN and the MRN being measured in dB/Hz. When the assumption is made that the noise sources are uncorrelated white noise sources, then the CNR for the information bearing electrical signal minus the monitoring signal ($i_{RF}-i_{FF}$) is given by $$CNR = -10\log((2E\epsilon^{-2}(1-G\alpha/\eta R)^2 + 1)B10^{RIN/10} + 2\epsilon^{-2}B10^{MRN/10}) \quad (7)$$

where B equals 30 KHz and $\epsilon$ is the relative contrast $\Delta R/(2R)$ which has a numerical value of 0.13 for PC/A1 media. In this model, the monitor signal used in the compensation is derived from the front facet of the laser diode and higher order laser noise contributions are included. For illustration, this model does not include shot noise and electronic noise, the contributions from these two noise sources may be insignificant in the write-once, optical information storage system. In a typical read/write head, the noise level of the electronic noise and the shot noise are in the range of $-135$ to $-140$ dB/Hz, the actual noise level depending on the power energizing the laser unit.

Referring once again to FIG. 2, the plot of the carrier to noise ratio, CNR, as a function of the relative intensity noise, RIN, for phase change on the aluminum media wherein the media reflectivity noise, is equal to $-129$ dB/Hz. The three curves correspond to no laser noise cancellation, $G\alpha=0$, perfect cancellation, $G\alpha = R\eta$, and partial cancellation, $G\alpha=0.8\eta R$. The experimental data indicates that a read/write head without front facet monitor subtraction is consistent with the $G\alpha=0$ curve. The examples where $G\alpha$ is not equal to zero show a dramatic increase in the tolerance to laser noise as well as a modest increase in the CNR (i.e., 3-5 dB) for typical laser noise in read/write heads having electronic and shot noise levels of $-125$ to $-130$ dB/Hz. When laser noise is the source of noise CNR increases of 21 dB for perfect cancellation and 13 dB for partial cancellation are achieved.

As will be clear, the present invention requires that the two signals, i.e., the information bearing electrical signal and the monitoring signal be in phase when the subtraction is performed. This phase coherence should not be difficult to achieve for frequencies generally 10 MHz or below. When the amplifier gain is fixed, then the media reflectivity variations and coversheet birefringence changes can unbalance the $G\alpha-\eta R$ by as much as 20%. However, the change in the carrier to signal noise, CNR, will not change unless the laser unit is exceptionally noisy. Because the correlation between fluctuations in the radiation emitted by the rear facet and the front facet of a laser unit has not been demonstrated, the monitoring of the front facet radiation of a laser unit is believed to be important.

In the preferred embodiment, a quarter wave plate has been used in the optical path. The function of the quarter wave plate is to reduce the feedback of radiation reflected from the storage medium into the laser and to increase the signal to noise seen by the detector. The present invention can provide compensation for the instabilities in the laser to the extent that the quarter wave plate is no longer required.

It will be now appreciated that there has been presented a technique for the reduction of noise originating in the laser unit in a read/write head in a storage medium with controllable optical (e.g., reflectivity) properties, write-once information storage system. By subtracting a signal derived from monitoring the front facet of a laser unit and subtracting the monitoring signal from the information bearing signal, the noise which arises from the laser unit can be reduced.

Operation of the present invention is believed to be apparent from the foregoing description and drawings, but a few words will be added for emphasis. In the write-only optical information storage system, the laser unit can be the largest source of noise. The laser unit noise can be significantly reduced by subtracting a signal derived from the front facet of the read/write head laser unit from the information bearing signal.

Although the invention has been described with reference to a write-once information storage system, it will be clear to those skilled in the art that the invention is applicable to other read/write head assemblies in optical information storage systems in which the fluctuations in the radiation source provide the principal contribution to the system noise. Examples of optical information storage systems, in addition to the write-once systems, to which the present invention is applicable are read only optical information storage systems and the magneto-optical or other phase change erasable information storage systems.

While the invention has been described with particular reference to a preferred embodiment, it will be understood by those skilled in the art that various changes may be made and equivalents may be substituted for elements of the preferred embodiment without departing from invention. In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. A read/write head in an information storage system, wherein information is stored in a storage medium having properties which can be altered to provide a controllable interaction with an impinging radiation beam, said information being stored and retrieved with said radiation beam, said read/write head comprising:
   a laser unit;
   a beam splitter providing a first radiation beam and for providing a second radiation beam from said laser unit;
   focusing means for focusing said first radiation beam on said storage medium;
   first detection means for detecting radiation reflected from said optical medium and deflected by said beam splitter;
   second detection means for detecting said second radiation beam deflected from said beam splitter; and
   combining means for combining signals from said first detection means and from said second detection means to cancel noise generated by said laser unit.

2. The read/write head of claim 1 further comprising a quarter wave plate positioned between said beam splitter and said storage medium.

3. The read/write head of claim 2 wherein said combining means includes an amplifier coupled to said second detection means for controlling an amplitude of a signal from said second detection means prior to said combining signals.

4. The read/write head of claim 2 wherein said information storage system is a magneto-optic storage system.

5. The read/write head of claim 2 wherein said storage medium is a write-once disk.

6. The read/write head of claim 2 wherein said storage medium is a read only disk.

7. The read/write head of claim 2 wherein said beam splitter is a polarization beam splitter.

8. A method for compensating for the noise generated by a laser unit in an optical storage system, wherein said storage system has an optical storage medium in which signal radiation from said laser unit illuminates a beam splitter, wherein after reflection by said storage medium the radiation is deflected by said beam splitter and applied to a first detector, said first detector providing a signal which is a function of a state of magnetic orientation of stored information of said storage medium being illuminated, wherein said method comprises the steps of:

applying separated laser radiation separated by said beam splitter form laser radiation applied to said quarter wave plate, said separated laser radiation being applied to a second detector;

combining output signals from said first and said second detector whereby at least a portion of the noise generated by said laser unit is cancelled from said first detector signal.

9. The method of claim 8 wherein said applying step includes the steps of:

adjusting an amplitude said second detector signal; and combining said adjusted amplitude second detector signal with said first detector signal.

10. The method of claim 9 wherein said applying step includes the step of applying radiation from a front facet of said laser unit to said second detector.

11. A read/write head for an information storage system in which the storage medium is an optical medium, said read/write head comprising:

laser means for providing a source of coherent radiation;

separation means for providing an interaction radiation component and a non-interaction component;

focusing means for applying said interaction radiation component to a predetermined location on a storage medium; said focusing means applying a reflected interaction radiation component to said separation means, said separation means deflecting a portion of said reflected interaction radiation component;

first detector means positioned receive said reflected radiation portion for providing a first electrical signal determined by said reflected radiation portion;

second detector means positioned to receive said non-interaction radiation component for providing a second electrical signal determined by said noninteraction radiation component; and combining means for combining said first and said second electrical signals whereby noise, resulting from instabilities in said laser means in said first electrical signal, is reduced.

12. The read/write head of claim 11 wherein said combining means includes a differential amplifier for combining said first and said second electrical signals.

13. The read/write head of claim 12 wherein said combining means includes a variable gain amplifier for controlling an amplitude of said first or said second electrical signal.

14. The read/write head of claim 11 further comprising a quarter wave plate positioned between said beam splitter and said storage medium.

15. The read/write head of claim 14 wherein said separation means includes a beam splitter.

16. The read/write head of claim 14 wherein said separation means includes a polarization beam splitter.

* * * * *